United States Patent
Chappell et al.

(10) Patent No.: US 9,047,591 B2
(45) Date of Patent: *Jun. 2, 2015

(54) SYSTEMS AND METHODS TO PLAN EVENTS AT DIFFERENT LOCATIONS

(75) Inventors: Stephen Chappell, Los Angeles, CA (US); Jay H. Lieske, Jr., Los Angeles, CA (US); Samantha Nebrich, Los Angeles, CA (US)

(73) Assignee: YELLOWPAGES.COM LLC, Glendale, CA (US)

( * ) Notice: Subject to any disclaimer, the term of this patent is extended or adjusted under 35 U.S.C. 154(b) by 1072 days.

This patent is subject to a terminal disclaimer.

(21) Appl. No.: 12/165,566

(22) Filed: Jun. 30, 2008

(65) Prior Publication Data

US 2009/0307268 A1    Dec. 10, 2009

Related U.S. Application Data

(63) Continuation-in-part of application No. 12/135,098, filed on Jun. 6, 2008.

(51) Int. Cl.
*G06F 15/16* (2006.01)
*G06Q 10/10* (2012.01)

(52) U.S. Cl.
CPC .................................. *G06Q 10/109* (2013.01)

(58) Field of Classification Search
CPC ..................... G06F 17/30884; G06Q 10/109
USPC ................................................ 709/204, 217
See application file for complete search history.

(56) References Cited

U.S. PATENT DOCUMENTS

| | | | |
|---|---|---|---|
| 6,690,672 B1 | 2/2004 | Klein | |
| 6,732,080 B1 * | 5/2004 | Blants | 705/7.18 |
| 7,289,812 B1 * | 10/2007 | Roberts et al. | 455/456.1 |
| 7,450,566 B2 | 11/2008 | Wong | |
| 2002/0131565 A1 * | 9/2002 | Scheuring et al. | 379/88.19 |
| 2002/0167919 A1 | 11/2002 | Marples et al. | |
| 2004/0234043 A1 | 11/2004 | Argo | |
| 2004/0234064 A1 | 11/2004 | Melideo | |
| 2004/0243939 A1 | 12/2004 | Perepa et al. | |
| 2004/0249951 A1 | 12/2004 | Grabelsky | |
| 2005/0018849 A1 | 1/2005 | Rodriguez et al. | |
| 2005/0256766 A1 | 11/2005 | Garcia et al. | |
| 2005/0289097 A1 | 12/2005 | Trossen et al. | |

(Continued)

FOREIGN PATENT DOCUMENTS

WO    03102738    12/2003

OTHER PUBLICATIONS

What is Web 2.0? Ideas, Technologis and implications for eduction; JISC Technology & Standards Watch report, Feb. 2007; Paul Anderson.*

(Continued)

*Primary Examiner* — June Sison
(74) *Attorney, Agent, or Firm* — Kilpatrick Townsend & Stockton LLP

(57) ABSTRACT

Systems and methods are provided to specify a location of a planned event via a selection of a listing that has location information. For example, in response to a search request a listing may show a business entity at a geographic location; and the user may select the listing as a way to specify the location of a new event or an existing event. In some embodiments, one event can have multiple listings specifying multiple locations.

22 Claims, 12 Drawing Sheets

(56) References Cited

U.S. PATENT DOCUMENTS

| | | | |
|---|---|---|---|
| 2006/0078096 A1 | 4/2006 | Poyhonen et al. | |
| 2006/0206480 A1* | 9/2006 | Heidloff et al. | 707/6 |
| 2007/0039024 A1* | 2/2007 | Krajcev et al. | 725/46 |
| 2007/0112656 A1 | 5/2007 | Howe et al. | |
| 2007/0177578 A1 | 8/2007 | Anspach et al. | |
| 2007/0233736 A1* | 10/2007 | Xiong et al. | 707/104.1 |
| 2008/0005268 A1 | 1/2008 | Chen | |
| 2008/0008306 A1 | 1/2008 | Kliger | |
| 2008/0071554 A1 | 3/2008 | Miles et al. | |
| 2008/0071833 A1 | 3/2008 | Madden | |
| 2008/0092059 A1 | 4/2008 | White | |
| 2008/0098079 A1 | 4/2008 | Sanghavi | |
| 2008/0134041 A1* | 6/2008 | Zinn | 715/733 |
| 2008/0141145 A1* | 6/2008 | Klausmeier | 715/751 |
| 2008/0201362 A1* | 8/2008 | Multer et al. | 707/103 R |
| 2008/0215678 A1* | 9/2008 | Coletrane et al. | 709/204 |
| 2009/0006442 A1* | 1/2009 | Anderson et al. | 707/102 |
| 2009/0012841 A1* | 1/2009 | Saft et al. | 705/10 |
| 2009/0132665 A1* | 5/2009 | Thomsen et al. | 709/206 |
| 2009/0222488 A1* | 9/2009 | Boerries et al. | 707/104.1 |
| 2010/0191657 A1 | 7/2010 | Melideo | |
| 2012/0203853 A1* | 8/2012 | Davis et al. | 709/206 |
| 2013/0166653 A1* | 6/2013 | Sherrets et al. | 709/204 |
| 2014/0195301 A1* | 7/2014 | Dear | 705/7.31 |
| 2014/0228056 A1* | 8/2014 | Busch | 455/456.3 |

OTHER PUBLICATIONS

ESI 2007 ACM SIGCHI Proceedings 2007 'Exploratory Searcch and HCI: Designing and Evaluating Interfaces to Support Exploratory Search Interaction'; White et. al.*

U.S. Appl. No. 61/068,086.*

U.S. Appl. No. 61/019,132.*

Evite, LLC, company and product information located at http://www.evite.com, available at least by May 9, 2008.

* cited by examiner

150

Business: Coffee /161 (Keyword)  Near: 93415 /163 (Address)   /165  Search /167  Hotlist /169

Star Coffee

★★★★☆ /151

101 Ocean View  
San Francisco, CA 93415 (0.1 mi, Map) /155  
153 /1-415-281-1157 (Call or Email) /157

Based on 2 reviews  
Rate it | Read reviews

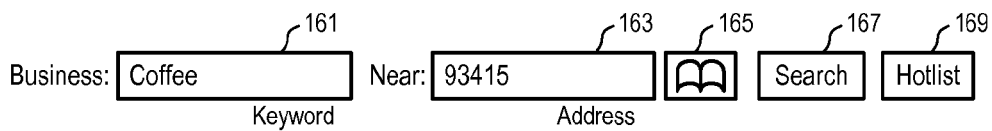
171 173 175 177 179

Bean Café

★★★☆☆

102 Ocean View  
San Francisco, CA 93415 (0.2 mi, Map)  
1-415-281-3765 (Call or Email or Web Site)  
Reservation  
159

Based on 17 reviews  
Rate it | Read reviews

• • •

Express Café

★★★★★

102 Bay view  
San Francisco, CA 93421 (1.1 mi, Map)  
1-415-781-2513 (Call or Email)

Based on 12 reviews  
Rate it | Read reviews

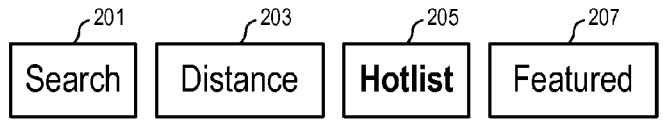
| Search | Distance | Hotlist | Featured |
Star Coffee
101 Ocean View
San Francisco, CA 93415
86 hotlisted ⌇209
Bean Café
102 Ocean View
San Francisco, CA 93415
75 hotlisted  >
⋮
200
FIG. 4
| Star Coffee | 211 |
|---|---|
| Rating: | ★★★★☆  > |
| Location: | 101 Ocean View San Francisco, CA 93415 |
| Phone: | (415) 621-1401 |
| Web Site: | http://www.starcoffee.com/ |
| Email: | info@starcoffee.com |
| Hours: | ⋮ |
213 Search nearby | 215 Add | 217 Share
210
FIG. 5

From: Sam Nebrich [snebrich@xyz.com]
To: John Bus [jbus@zyx.com]
Subject: Sam shared a plan from Yellowpages.com Sam shared a plan from Yellowpages.com with you.

Night Out

Thursday, April 10, 2008
From 8:00 PM to 10:00 PM

Let's have coffee together before we head to concert.

8:00 PM – 9:00 PM: Star Coffee
                    245 — 101 Ocean View
                    San Francisco, CA 93415 (Map | Direction)
                    (415) 552-4055                241    243

9:00 PM – 10:00 PM: Radiohead
                    121 Ocean View
                    San Francisco, CA 93415 (Map | Direction)

Price: $150-200
                    Age Suitability: None Specified
                    Performers: Radiohead Who's Invited:

Jane Plain <jplain@tvb.com>
Jackie Brown <jbrown@dfk.com>

SYSTEMS AND METHODS TO PLAN EVENTS AT DIFFERENT LOCATIONS

CROSS-REFERENCE TO RELATED APPLICATION

The present application is a continuation in part application of U.S. patent application Ser. No. 12/135,098, filed Jun. 6, 2008 and entitled "Systems and Methods to Plan Events at Different Locations," the disclosure of which is hereby incorporated herein by reference.

FIELD OF THE TECHNOLOGY

At least some embodiments disclosed herein relate to searching and sharing information in general and, particularly but not limited to, scheduling events using data processing systems.

BACKGROUND

There are some applications that are designed to assist people in scheduling appointments, meetings and social events, such as birthday parties, etc.

For example, a calendar application running on a personal digital assistant (PDA) may allow a user to schedule an appointment on the calendar presented on the PDA device. The user may type in a description of the location of the appointment, a subject for the appointment, and a note for the appointment. The user may specify the starting time and the ending time of the appointment, and select an option to receive, from the PDA device, an alert about the appointment prior the appointment.

Some calendar applications allow the user to invite participants. For example, the user may select email addresses from a list as invitees of a meeting and type in a description about the location of the meeting and type in a separate message about the meeting. An email program integrated with the calendar application then sends email invitations to the invitees.

There are web based services that allow a user to compose a message and to invite participants to an event. A web-based user interface allows the user to type in a description of the location of the event, the email addresses of the invitee, and an invitation message. The web-based application then sends email invitations to the invitees based on the information received from the web-based user interface.

BRIEF DESCRIPTION OF THE DRAWINGS

The embodiments are illustrated by way of example and not limitation in the figures of the accompanying drawings in which like references indicate similar elements.

FIG. 3 illustrates a user interface to search and present listings of locations according to one embodiment.

FIGS. 4-5 illustrate another user interface to search and present listings of businesses according to one embodiment.

FIG. 12 illustrates an electronic message generated to share an event planned using a listing according to one embodiment.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present disclosure provides systems and methods to specify a location of a planned event via a selection of a listing that has location information. For example, in response to a search request a listing may show a business entity at a geographic location; and the user may select the listing as a way to specify the location of a new event or an existing event. In some embodiments, one event can have multiple listings specifying multiple locations. The disclosure includes methods and apparatuses which perform these methods, including data processing systems which perform these methods, and computer readable media containing instructions which when executed on data processing systems cause the systems to perform these methods.

Figure 1:
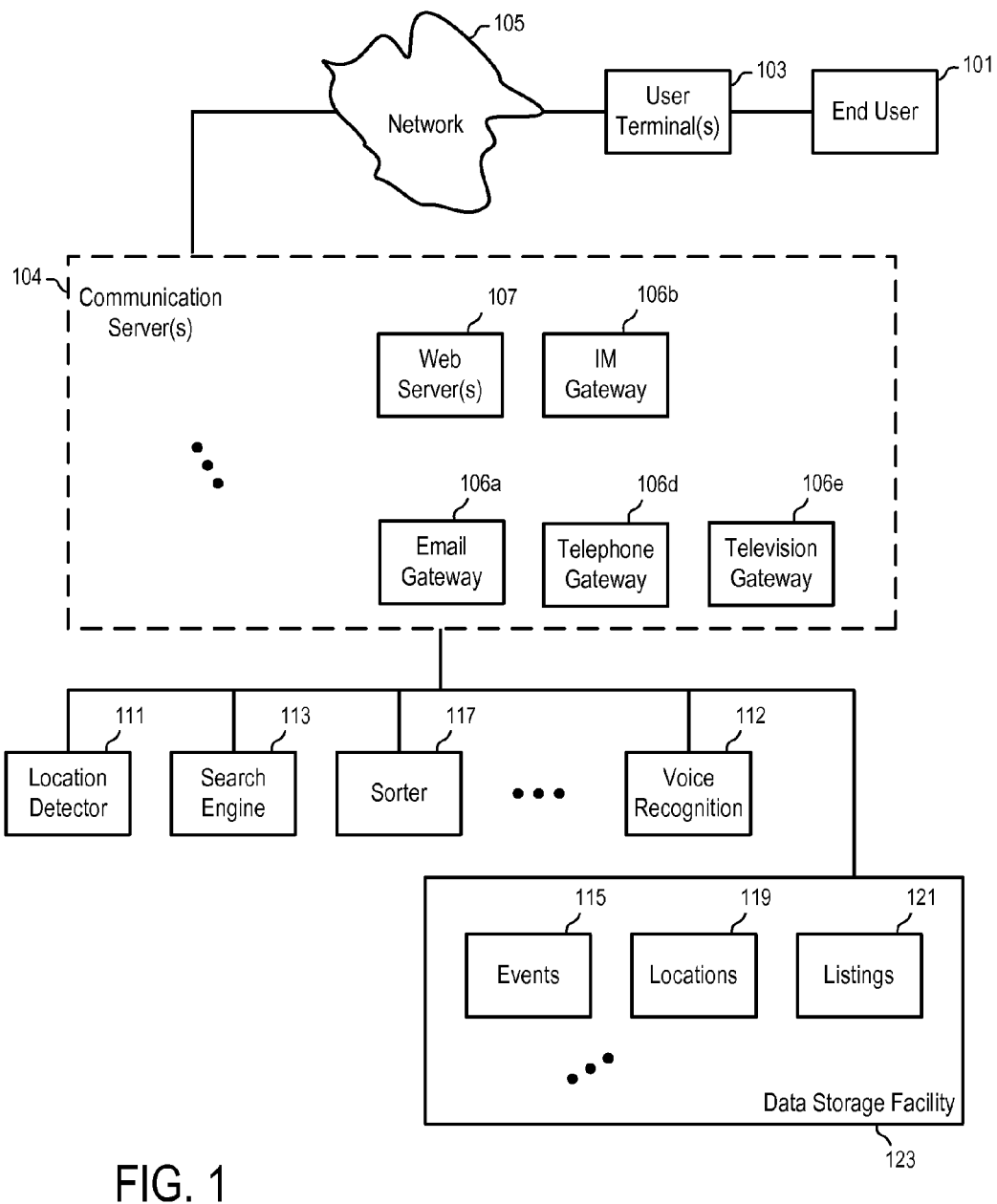
FIG. 1 shows a system to facilitate event planning according to one embodiment.

FIG. 1 shows a system to facilitate event planning according to one embodiment.

In FIG. 1, an end user (101) uses a user terminal (103) to submit a search request over the network (105) to a communication server (104) and/or to receive search results. The network (105) may include a local area network, a wireless data communication network, a telephone network, a cellular communication network, a telecommunication network, an interactive television network, an Internet Protocol Television (IPTV) network, an intranet, or a combination of networks, such as the Internet.

A communication server (104) may include a web server (107), an email gateway (106a), an instant messaging gateway (106b), a telephone gateway (106d), or a television gateway (106e), or other types of servers, such as an application gateway (not shown) to interface with different servers. Some embodiments may use one type of communication server (104), such as a web server (107), to receive the search request and another type of communication server (104), such as a television gateway (106e), to provide the search results. Some embodiments may use different types of communication servers (104) to service different types of user terminals (103).

In one embodiment, the web server (107) communicates with the user terminal (103) via HyperText Transfer Protocol (HTTP) and/or other types of communication protocols, such as File Transfer Protocol (FTP), Wireless Application Protocol (WAP), etc. The web server (107) may provide static web pages, dynamic web pages, and/or web services. In some embodiments, the web server (107) provides web applications to the user terminal (103) for execution in a web browser running on the user terminal (103); and the web applications may include scripts, such as Java, JavaScript, etc., for execution within an isolated environment in a browser. In some embodiments, the web server (107) may provide rich-client applications to the user terminal (103); and the rich-client application may be programmed in traditional programming languages, such as C/C++, to have full access to functions of the operating system running on the user terminal (103).

The communications server(s) (104) communicates with a location detector (111), a search engine (113), and/or a sorter (117) to process the search request and present search results based on the information stored in a data storage facility (123), such as listings (121) about business entities or public events, or other types of searchable events that are scheduled at predetermined dates and times, at corresponding geographic locations (119). In some embodiments, the location detector (111), the search engine (113), the sorter (117) and/or other modules, such as the voice recognition system (112), are servers communicating with the communication server (104) over a network, such as a local area network, an intranet, or Internet. These servers and the communication servers (104) may run on same or separate computers. In one embodiment, there may be one or more layers of application servers between the communication server (104) and the data storage facility (123) to process the business logic and data access of the rich client applications. Alternatively, application servers may be integrated with the communication servers (104), such as the web servers (107). Thus, the disclosure is not limited to a particular type of connections among the communication servers (104), the location detector (111), the search engine (113), the sorter (117), the data storage facility (123) and other modules, such as the voice recognition system (112).

In FIG. 1, the data storage facility (123) stores events (115) the end users (e.g., 101) planned. In some embodiments, the user terminal (103) stores the events (115).

In some embodiments, both the user terminal (103) and the online data storage facility (123) store the events (115) the end user (101) planned using the listings (121). When there is a data communication connection between the user terminal (103) and the online data storage facility (123), the user terminal (103) and the online data storage facility (123) synchronize their copies of the events (115) for the end user (101).

In one embodiment, the end user (101) can use the search engine (113) to select one listing (121) from the listings (121) stored on the data storage facility and use the selected listing (121) as an indicator of the location for a new event (115) or an existing event (115).

Listings (121) of businesses or people, such as restaurants, car dealers, retailer locations, service providers, gas stations, parking lots, plumbers, and the like, may have street addresses or other location parameters, such as longitude and latitude coordinates, stored as locations (119). The listings (121) may include addresses, telephone numbers, advertisements, announcements, and/or events, etc. For example, the listing (121) may be related to a public event that has a time associated with a location (119). The locations (119) may be part of the listings (121), or associated with the listings (121). In one embodiment, the listings (121) include information related to business entities at corresponding locations (119). The entities may be businesses or people. Some of the entities may be advertisers who pay advertisement fees to promote their listings (121). Some of the entities may be non-advertisers who have free listings (121).

In one embodiment, the listings (121) are accessible to the public or to registered members. The events (115) are associated with the corresponding end users (e.g., 101) who created the corresponding events (115). The web servers (107) generally limit the access to the events (115) to those who created the corresponding events (115). After the end user (101) specifies the identities of the friends or invitees with whom to share an event (115), the web servers (107) then allows the friends or invitees to access the shared event (115).

In one embodiment, the end user (101) may provide instructions to the user terminal (103) to notify the friends or invitees about the event (115) via email, short message service (SMS), voice mail, fax, or other communication channels, such as instant messaging, telephone, etc. The user terminal (103) or the web server (107) or a separate server not shown in FIG. 1, such as an application server, automatically generates the notification message based on the listing (121) by including a link to the listing (121) or a reference to the listing (121) in the notification message to show that the location of the event (115) is the corresponding location (119) of the listing (121). Thus, the friends or invitees not only have the location of the event (115), but also have the additional information of the listing (121) related to the event (115), such as the telephone number of the business entity, a web site of the business entity, a brief description of the business entity, user ratings and reviews of the business entity, etc.

In one embodiment, the communication servers (104) provide a user interface for user interaction with listings. For example, the web servers (107) may provide a user interface via static web pages, dynamic web pages, and/or web services, etc. For example, the web servers (107) may provide the listings (121) with links to detail information pages of the listings (121), such as a map, business hours, driving directions, etc. The web servers (107) may provide user interfaces for the users (e.g., 101) to rate the listings (121), provide reviews, view reviews from other users (e.g., 101), etc. The web servers (107) may provide user interfaces to make reservations or to make purchases via the listings (121). The web servers (107) may provide user interfaces to allow the end user (101) to plan events using the listings (121), to store or bookmark selected listings, to share the listings with friends, etc. The web servers (107) can track various different types of user interactions with the listings to determine or estimate the level of user interest in the listings. The web servers (107) may provide rich client applications for execution in the user terminal to provide the user interfaces.

In one embodiment, the location detector (111) determines a location of interest to the end user (101) related to the search request. The end user (101) may explicitly specify the location of interest in the search request; and the location detector (111) extracts the location of interest from the search request.

Alternatively, the end user (101) may implicitly specify the location of interest based on a preference stored and associated with identification information of the end user (101) or the user terminal (103).

In some embodiments, the location detector (111) automatically identifies the location of interest based on determining the current location of the user terminal (103) that is used to submit the search request. For example, the location detector (111) may determine the location of the user terminal (103) based on a connection point the user terminal (103) used to access the network (105) (e.g., based on the location of a wireless network access point, a base station of a cellular communication system, or a connection point to a wired network). In some embodiments, the user terminal (103) automatically determines its current position (e.g., via a satellite positioning system, or a cellular positioning system) and transmits the determined or estimated position to the web server (107) with the search request, or provides the position in response to a request from the location detector (111).

In one embodiment, the search engine (113) retrieves listings (121) from the data storage facility (123) according to a search request. The sorter (117) ranks the listings (121) in the search results according to the distance between the location of interest and the locations (119) of the listings (121), or according to current levels of user interest in the retrieved listings (121).

For example, the web servers (107) may track various different types of user interactions with the listings (121) to determine or estimate the level of user interest in the listings (121).

In some embodiments, the data storage facility (123) stores statistics of the tracked user interactions to determine an indicator of the level of user interest in a listing (121). The indicator of user interest may be in the form of hotlist points assigned to a listing (121). In one embodiment, the hotlist points represent the popularity of a listing (121) among a set or subset of users, such as users of iPhone or iTouch from Apple, Inc. The data storage facility (123) may store the statistics as logs of web access to the listings (121) and/or other information related to the listings (121). The data storage facility (123) may store the statistics in the form of counts of various events associated with user interaction with listings (121).

For example, in one embodiment, hotlist points of a listing (121) is a function of statistics such as selection percentile, average user rating, and advertiser value.

In one embodiment, selection percentile is an n-tile partition of the number of selections of presented listings (121). For example, when the end user (101) clicks a link of a listing (121) to view a page showing additional information about the listing (121), the number of selections of the listing (121) increases by one. A listing in the group of the top 1% ranked according to the number of selections gets a selection percentile 100; and a listing at $33^{rd}$ percentile will get a value of 67.

In some embodiments, user selections of different links of a listing (121) to view different pages, such as a map, driving directions, details, etc., may have different weight in counting the number of selections for the determination of selection percentile. Further, each end user (101) may contribute only up to a predetermined number of selections to a listing (121) within a predetermined time period (e.g., one click per month), to prevent click abuse.

In one embodiment, advertiser value includes points and tier value for subscription listings. For example, when a listing pays a certain level of subscription, the listing has a predetermined tier value corresponding to the subscription level of the listing. Further, the listing may pay additional options, such as banner advertisements, video advertisements, etc. The options have corresponding predetermined points. Thus, advertiser value of a listing is a function of subscription level and listing options.

In one embodiment, hotlist points of a listing are a weighted sum of selection percentile, average user rating, and advertiser value. For example, hotlist points can be computed based on the following expression.

$$w_a \times \text{Selection}_{Percentile} + w_b \times \text{Rating}_{Average} + w_c \times \text{Value}_{Advertiser}$$

where $\text{Selection}_{Percentile}$ represents selection percentile; $\text{Rating}_{Average}$ represents average user rating; and $\text{Value}_{Advertiser}$ represents advertiser value; and $w_a$, $w_b$, and $w_c$ are predetermined coefficients. For example, in one embodiment, selection percentile is in the range [0, 100], average user rating in [0, 5], and advertiser value in [0, 35000]; and $w_a=0.005$, $w_b=0.08$, and $w_c=1/350000$. Thus, selection percentile contributes up to 50% of "hotness", average user rating up to 40%, and advertiser value up to 10%; and hotlist points are in the range [0, 1]. Other combinations of weight coefficients can also be used to empirically determine the indicator of popularity among a group of end users (e.g., 101).

Other embodiments may use different types of expressions, such as $\text{Selection}_{Percentile} \times \text{Rating}_{Average} \times \text{Value}_{Advertiser}$. Thus, the disclosure is not limited to particular types of expressions.

In one embodiment, the user terminal (103) is a data processing system, such as a notebook computer, a personal computer, a workstation, a network computer, a personal digital assistant (PDA), a mobile phone, a cellular phone, a television set with or without a set top box, a game console, an electronic kiosk, microprocessor-based or programmable consumer electronics, and the like.

In one embodiment, the user terminal (103) includes a web browser which allows the end user (101) to submit a search request to one of the web servers (107) for location dependent information, such as a listing (121) of businesses or people, such as restaurants, car dealers, retailer locations, service providers, gas stations, parking lots, plumbers, and the like. Alternatively, the user terminal (103) may provide the search request via other communication channels, such as email, short message service (SMS), instant messaging (IM), telephone connection, etc. For example, the user terminal (103) may provide the search request to an email gateway (106a) via email, or to an IM gateway (106b) via instant messaging, or to a telephone gateway (106d) via a telephone call, or to a television gateway (106e) via an interactive television system. Some embodiments may use other types of gateways not shown in FIG. 1, such as gateways for SMS. Thus, the disclosure is not limited to the examples or combinations illustrated in FIG. 1.

In some embodiments, the end user (101) may use one user terminal (103) to submit the search request and another user terminal (103) to receive the search results. For example, the user (101) may submit the search request via an SMS message through one user terminal (103), and receive the search results at another user terminal (103) via email. For example, the user may submit the search request via voice through one user terminal (103) and receive the search results via a web page at another user terminal (103) or at the same user terminal (103). For example, in one embodiment, the user (101) may use a mobile phone as the user terminal (103) to transmit voice information, via a data connection through the network (105) and the web server (107) (or email gateway (106a), or IM gateway (106b), or other data communication gateways), or a telephone connection through a telephone gateway (106d)), to a voice recognition system (112) to formulate a search and receive a web page or email at the same user terminal (103) or at another user terminal (103) that shows the results of the search.

In one embodiment, one computer system implements the web servers (107), the location detector (111), the search engine (113), and the sorter (117). Alternatively, different processes running on one or more shared computers may implement some of the components (107, 111, 113, and 117). For example, one computing module, thread, or process may implement multiple of the components (107, 111, 113, and 117). In some embodiments, special purpose data processing systems implement the one or more of the components (107, 111, 113, and 117), such as using Application-Specific Integrated Circuit (ASIC) or Field-Programmable Gate Array (FPGA). In some embodiments, processes running according to software instructions on general purpose data processing systems, such as general purpose personal computers or server computers, can implement the components (107, 111, 113, and 117). Thus, the implementations are not limited to hardware, software, or particular combinations of hardware and software.

Different embodiments may implement the data storage facility (123) in different ways. For example, one or more data processing systems may store the information about the events (115), the locations (119) and the listings (121). For example, one or more relational or object oriented databases, or flat files on one or more computers or networked storage devices, may store the information about the events (115), the locations (119) and the listings (121). In some embodiments, a centralized system stores the information about the events (115), the locations (119) and the listings (121); alternatively, a distributed system, such as a peer to peer network, or Internet, may store the information about the events (115), the locations (119) and the listings (121).

Figure 2:
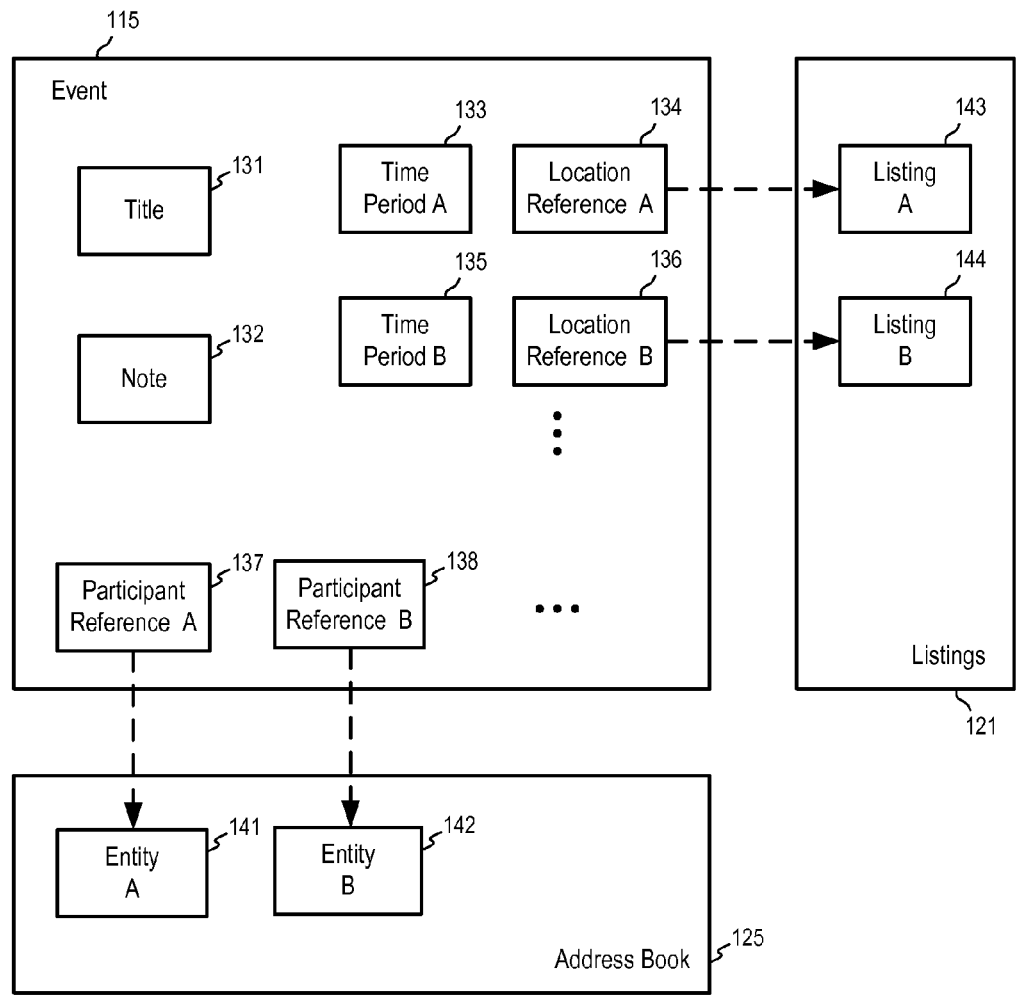
FIG. 2 illustrates a representation of an event according to one embodiment.

FIG. 2 illustrates a representation of an event according to one embodiment. In FIG. 2, an event (115) includes a title (131), a note (132), one or more location references (134 and 136), and the scheduled time periods (133 and 135) associated with the locations references (134 and 136). The event (115) may optionally include one or more participant references (e.g., 137 and 138).

In FIG. 2, the location references (134 and 136) are in a form of references to listings (143 and 144) of the listings (121) on the data storage facility (123) of the web servers (107). The listings (121) have corresponding locations (119); and thus the location references (134 and 136) implicitly specify the locations (119) via association with the listings (121). In some embodiments, a copy of the location (119) of the listings (143 and 144) is also stored within the event (115) as a backup copy, which is accessible when the listings (121) are not accessible. In one embodiment, the reference to a listing may include a reference to the web server.

Using the references (134 and 136) to the listings (143 and 144) to specify the locations (119) of the events (115) provides the user (101) with convenient access to the rich information offered by the listings (143 and 144), in addition to the location information. Thus, the references (134 and 136) to the listings (143 and 144) integrate the event planning and the information resource available from the web servers (107), enrich user experience and simplify the event planning process.

In one embodiment, when the listing (121) is about an event that has an associated time period, the user planned event (115) uses the time period of the event listing (121) as the time period of the user planned event (115). For example, when the listing B (114) has a time period for an event announced by the listing B (114), the user planned event (115) has the time period B (135) that is the same as the time period for the event announced by the listing B (114). In one embodiment, the user planned event (115) stores the time period B (135) corresponding to the time period for the event announced by the listing B (114). In another embodiment, the user planned event (115) stores the time period reference (not shown) to indicate that the time period of the user planned event (115) corresponds to the time period for the event announced by the listing B (114).

Thus, the user terminal (103) or the web server (107) allows the user (101) to incrementally build up the content of an event (115) by simple selection of a listing (121) while searching or viewing businesses listings (121) or published event listings (121). The end user (101) can add the listing (121) into an event (115) with a selection of a user interface element. Thus, the end user (101) does not have to copy and paste information by going back and forth between different applications. The user terminal (103) or the web server (107) allows the user (101) to easily collect information related to locations (119) into a planned event (115).

In FIG. 2, the participant references (137 and 138) point to the entities (141 and 142) in an address book (125). In one embodiment, the user terminal (103) and/or the data storage facility (123) stores the address book (125). For example, in one embodiment, the address book (125) is accessible via the web servers (107).

In one embodiment, the end user (101) can insert the references (134 and 136) to the listings (143 and 144) into the event (13) by selecting from listings (121) presented on the user terminal (103). The user terminal (103) may present the listings (121) in response to a search request from the end user (101), or in response to the end user (101) browsing a category of listings (121). The end user (101) can also specify participants (137 or 138) by selecting from the address book (125). Alternatively, in some embodiments, the end user (101) may type a description to specify some locations without using references (134 and 136) to listings (121), or manually enter the contact information of some participants without using the address book (125).

In one embodiment, without specifying a keyword, the end user (101) may request a list of a subset of the listings (121) that have corresponding locations (119) near the current location of the user terminal (103) and that are ranked with top levels of user interest. The end user (101) then selects one from the subset of the listings (121) as a location of the event (115).

FIG. 3 illustrates a user interface to search and present listings of locations according to one embodiment. In FIG. 3, a user terminal (e.g., 103) provides a search user interface (150), which includes an input box (161) to receive one or more keywords, and an input box (163) to receive a location of interest. The end user (101) may alternatively use the icon button (165) to select the location of interest from a list of bookmarked locations.

In one embodiment, a bookmarked location can be a listing (121) the end user previously added to a list of favorites. The listing (121) has a location (119); and the bookmarked listing (121) represents the location (119) corresponding to the listing (121). An end user (101) can select the bookmarked listing (121) as a way to specify a location of interest. For example, the end user (101) can select the bookmarked listing (121) to search for other businesses near the location of the bookmarked listing (121).

In one embodiment, the end user (101) may select an entry of an address book to specify the location of interest in the input box (163). In one embodiment, the end user (101) may select a location from an interactive map.

In FIG. 3, after the end user (101) specifies the keyword in the input box (161) and the location of interest in the input box (163), the end user (101) can select the search button (167) to search for listings (121) of businesses that match the keyword and that are located near the location of interest. The end user (101) may select the icon button (169) to request listings (121) of "hot" businesses that match the keyword and that are located near the location of interest.

In one embodiment, "hot" businesses are those who have high levels of user interest. The sorter (117) may sort the search results according to the levels of current user interest for presentation on the user terminal (103) via the web servers (107).

In one embodiment, "hot" businesses are those who are popular among a group of end users (101), such as the end users (101) of a particular type of user terminals (103), such as the end users (101) of iPhone or iPod Touch from Apple, Inc., end users (101) of interactive television (e.g., via U-verse from AT&T), end users (101) of a type of web browser, etc.

After the search interface (150) receives the selection of the search button (167) (or the icon button (169) for popular listings (121)), the user terminal (103) submits the search request to web server(s) (107).

In one embodiment, the end user (101) may select the "hotlist" button (169) without specifying a keyword in the input box (161) and/or a location of interest in the input box (163). When the location of interest is not specified, the location detector (111) detects or estimates the current location of the user terminal (103) as the location of interest. When no keyword is specified in the input box (161), the search engine (113) performs the search based on the location of interest; and the search results are not limited to a particular category or keyword. The search engine (113) and/or the sorter (117) can select or order the listings (121) based on the level of user interest in listings (121) near the location of interest.

In one embodiment, the end user (101) implicitly specifies the location of interest based on the location of the user terminal (103), or based on a preference setting of the end user (101). In one embodiment, the location detector (111) determines the location of the user terminal (103) or the preference setting of the end user (101); and the input box (163) presents the location determined by the location detector (111) for verification and/or for modification.

For example, the user terminal (103) (e.g., with a global positioning system (GPS) unit) or the location detector (111) can automatically determine the current location of the user terminal (103) that presents the search user interface (150). The input box (163) displays the automatically determined location of the user terminal (103) as a default location; and the user may specify an alternative location via the input box (163) (or via the icon button (165)).

In FIG. 3, the user interface (150) presents the search results under the input boxes (162 and 163). In the example illustrated in FIG. 3, the user interface (150) presents listings (121) of business products and services in response to a search request.

In FIG. 3, the user interface (150) presents the listings (121) in an order according to the distance to location of interest. The measure of distance to the location of interest may be based on an estimated transportation time, a driving distance, a line-of-sight distance, according to user ratings, or according to the level of user interest, etc. In FIG. 3, if the end user (101) selects the icon button (169), the user interface (150) changes the order of the listings (121) to present the listings (121) according to the level of user interest.

In one embodiment, the listing (121) represents a business of products or services. The technologies disclosed herein can be used, for example, in a web site such as YELLOWPAGES.COM. The business entity of the listing (121) may pay a fee to become an advertiser or not pay a fee to have a free listing (121).

In FIG. 3, the user interface (150) presents a listing (121), such as the listing (121) for "Star Coffee", with various information about the business entity of the listing (121), including the street address, a telephone contact (153), a distance (155) to the location of interest, a user rating (151), a link (157) to initiate a telephone call to an entity of the listing (121), and other user interface elements (e.g., 159, 171-179) to interact with the listing (121).

For example, the end user (101) may select the link (159) to initiate a reservation process.

For example, the end user (101) may select the icon button (171) to search near the location (119) of the listing (121) for "Star Coffee", using the location (119) of the listing (121) for "Star Coffee" as a location of interest.

For example, the end user (101) may select the icon button (173) to share the listing (121) with a friend via email, SMS, IM, etc. In one embodiment, after the end user (101) selects the icon (173), a further user interface allows the end user (101) to specify an email address, a mobile phone number, or an instant messaging user identifier to send the listing (121), or a link to the listing (121), via email, SMS, or IM.

In one embodiment, the user terminal (103) or the communication server (104) or another module not shown in FIG. 1 generates the message to share the listing (121). The message includes a user interface element which is selectable by a viewer to add the listing (121) to an event (115) of the viewer of the message.

For example, the end user (101) may select the icon button (175) to add the listing (121) to a list of favorite listings of the end user (101).

For example, the end user (101) may select the icon button (177) to use the listing (121) as an indicator of a location for planning or scheduling an event. The user terminal (103) and/or the data storage facility (123) may store the event in a calendar and/or share the event (115) with one or more friends of the end user (101) via email, SMS, IM, voice mail, fax, etc. In one embodiment, after the end user (101) selects the icon button (177), the end user (101) can select an event (115) from a list of events (115) planned by the end user (101) to add the listing (121) to the selected event (115) or choose to add the listing (121) as a location in a new event (115).

For example, the end user (101) may select the icon button (179) to obtain driving directions to "Star Coffee" (e.g., starting from the location of interest specified in the entry box (163), or from the current location of the user terminal (103)).

In one embodiment, the advertiser pays a predetermined fee for priority in the display of the listings (121). For example, the advertiser may pay a monthly advertisement fee, or an advertisement fee charged for a predetermined number of presentations, to obtain a high priority in the ranking of the listings (121).

In another embodiment, the advertiser pays a predetermined fee when a link presented in the listing (121) forwards the end user (101) to a web location specified by the advertiser, such as a web site of the advertiser. In one embodiment, the advertiser pays a predetermined fee when the end user (101) calls the advertiser using the telephone contact provided in the listing (121).

In one embodiment, the operator of the search engine (113) specifies the predetermined advertisement fees. In another embodiment, the advertiser specifies and offers the predetermined advertisement fees; and the advertisers can adjust the offer of the advertisement fees to balance the need for a high ranking and the cost.

In FIG. 3, the listings (121) provide the "call" link to allow a customer to request a call back to the customer for a phone connection to the advertiser. When a telephonic device (e.g., a mobile phone or a computer having a phone implemented partially via software, etc.) presents the listing (121), the customer can use the "call" link to initiate a call from the telephonic device.

In FIG. 3, the listings (121) provide the "email" link to send the listing (121) and/or the phone number via email to an address specified by the user. In some embodiments, the user interface (150) also provides the end user (101) with an option to send the phone number via SMS, an option to save the listing (121) as a note, etc.

In FIG. 3, the listing (121) for "Bean Cafe" includes a "web site" link, which when selected by the end user (101) forwards the end user (101) to the web site of the business "Bean Cafe", or an information page hosted on the web server (107) to provide further details about the business, such as the business hours, payment options accepted by the business, a detailed description of the business, videos related to the business, etc.

In FIG. 3, the listings (121) also include links related to customer ratings of the business based on feedback from prior customers of the business. For example, the end user (101) may read reviews written by other users, or write about and/or rate the business.

In some embodiments, the listings (121) include banner or video advertisements (not shown in FIG. 3) from the corresponding entities of the listings (121). The listings (121) may include links to web locations specified by the advertisers.

In one embodiment, the heading "Star Coffee" includes a link to a web site of the business/advertiser of the listing (121). When the end user (101) selects the link, the link directs the end user (101) to the web site of the business/advertiser; and the advertiser may pay a per-selection advertisement fee, for the end user (101) that is directed by the link to the web site of the business/advertiser.

Alternatively or in combination, the end user (101) may call the telephone contact (153) provided in the listing (121); after a connection server connects the telephone call from the end user (101) to the business/advertiser, the advertiser may pay a per-call advertisement fee, responsive to the call that is directed by the telephone contact (153) to the business/advertiser.

In one embodiment, to track the calls forwarded to the business/advertiser, the listing (121) provides a telephone number of a connection server as the telephone contact (153) of the listing (121). When the connection server receives the call to the telephone number of the connection server, the connection server forwards the call to the telephone number of the business/advertiser, or makes a separate call to the telephone number of the business/advertiser and bridges the calls to make the connection.

FIGS. 4-5 illustrate another user interface to search and present listings of businesses according to one embodiment. In one embodiment, a user terminal (103) implementing the user interface as illustrated in FIGS. 4-5 is a mobile computing device having radios for wireless access to the web servers (107), such as radios for cellular communications, wireless local area network communications, wireless personal area network communications, etc. The mobile computing device may be a cellular phone with an integrated Internet browser and a touch screen, with or without a keyboard. The mobile computing device may be a personal digital assistant with wired or wireless connections for network data communications. For example, the mobile computing device may be an iPhone or iPod Touch from Apple, Inc.

In FIG. 4, the user interface (200) includes a set of icon buttons (201-207). The end user (101) can select the search button (201) to request an interface (not shown) to specify a search criterion, such as a keyword, a location of interest, etc. The user interface (200) presents the search results under the set of icon buttons (201-207).

In FIG. 4, the end user (101) can select the icon button (203) to sort the search results according to the distance to the location of interest. In one embodiment, before the end user (101) specifies a search criterion using the search button (201), the end user (101) can directly select the icon button (203) to request a list of listings for businesses near the current location of the user terminal (103).

In one embodiment, when the icon button (203) is selected, the sorter (117) determines the distance between the location (119) of the listing (121) and the location of interest specified by the end user (103) (or the location of the user terminal (103), if the end user (103) did not explicitly specify a location of interest). In one embodiment, the sorter (117) sorts the listings (121) strictly according to the determined distance. In another embodiment, the sorter (117) may divide the listings into a number of groups based on the distance, and sort the listings within the groups according to another parameter, such as popularity, advertiser value, average user rating, or a combination of parameters.

The end user (101) can select the hotlist button (205) to sort the search results according to the level of user interest represented by the hotlist points. In one embodiment, before the end user (101) specifies a search criterion using the search button (201), the end user (101) can directly select the hotlist button (205) to request a list of "hot" or "popular" businesses near the current location of the user terminal (103) on which the user interface (200) is.

FIG. 4 illustrates a presentation of a set of listings (121) sorted by the sorter (117) according to hotlist points. The end user (101) can select a listing (121) from the set of listing (121) (e.g., by selecting the icon (209)) to view details of the listing (121).

In FIG. 4, the end user (101) can select the icon button (207) to request a list of featured listings (121). In one embodiment, the search engine (113) selects the featured listings (121) from a subset of the listings (121) that are advertised. In one embodiment, the search engine (113) uses a set of predetermined criteria to ensure the quality of the featured listings (121). For example, one criterion may require that a featured listing (121) have a user rating above a threshold. The sorter (117) may rank the featured listings (121) in an order according to the advertisement fees of the listings (121). In one embodiment, the featured listings (121) pay a specific fee for being featured. In one embodiment, a featured listing (121) may not require a specific fee. For example, a listing of a recently opened business may be featured without a specific fee, such as an advertisement fee or subscription fee.

The user interface (210) in FIG. 5 shows a display of details of the listing (121) for "Star Coffee". It provides information about phone number, web site, email contact, business hours and/or other information such as the address, user rating, etc. In FIG. 5, the end user (101) can select the icon button (213) to search nearby the location of the listing (121), select the icon button (217) to send a message to another user (101) to share the information about the listing (121), or select the icon button (215) to add the listing (121) to a favorite list, an existing event, or a new event.

In one embodiment, the listing (121) shows an icon (211) to indicate that the listing (121) is already in the favorite list.

Figures 6, 7:
FIG. 6 shows a user interface to add a listing into an event according to one embodiment.
FIG. 7 illustrates a user interface to edit an event according to one embodiment.

FIG. 6 shows a user interface to add a listing (121) into an event (115) according to one embodiment. After the icon button (215) in FIG. 5 is selected, the user interface shown in FIG. 6 includes a set of buttons (221-227) that provide the user (101) with the options to add the listing (121) to a favorite list, an existing event, or a new event, or cancel the operation.

For example, the end user (101) can select the "Add to Favorites" button (221) to add the listing (121) to favorites for future access. For example, the end user (101) can select the "Add to an Existing Plan" button (223) to add the listing (121) as a location indicator in an existing plan scheduled in a calendar. For example, the end user (101) can select the "Add to a New Plan" to generate a new plan of an event, using the location of the listing (121) as a location of the event.

FIG. 7 illustrates a user interface to edit an event according to one embodiment. In FIG. 7, the end user (101) can use the user interface to interact with an event planned using a selected listing (121) for "Star Coffee". In FIG. 7, the event (115) shows the location of the listing (121) for "Star Coffee" as the location of the event (115); and the end user (101) may add additional locations by selecting a listing (121) from a list of favorites, or selecting an entry from an address book, or typing in an address for the location. In one embodiment, the user can recall a previously saved search for a list of listings (121) and select a listing (121) from the list to specify a location of the event (115).

In FIG. 7, the end user (101) can also add a list of one or more friends to the planned event (115) by selecting the friends from an address book or by typing in contact information, such as email address, phone number, IM user identifiers, etc. When the end user (101) shares the plan, the user terminal (103) and/or the web server (107) can automatically generate a message for notifying the friends via email, SMS, IM, and/or voice mail, fax, etc.

Figure 8:
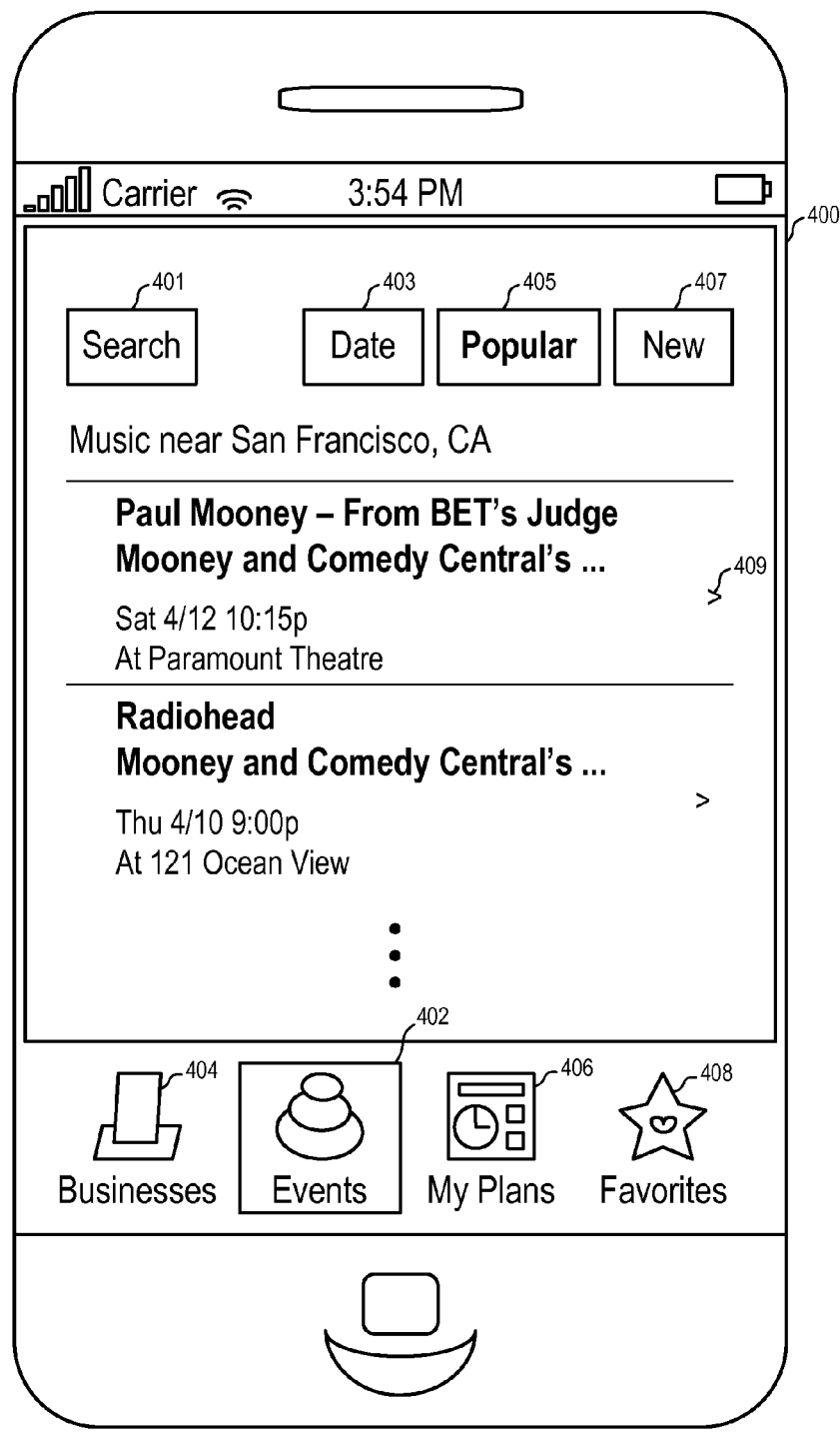
FIGS. 8-9 illustrate user interfaces to search and present listings of events according to one embodiment.
Figure 9:
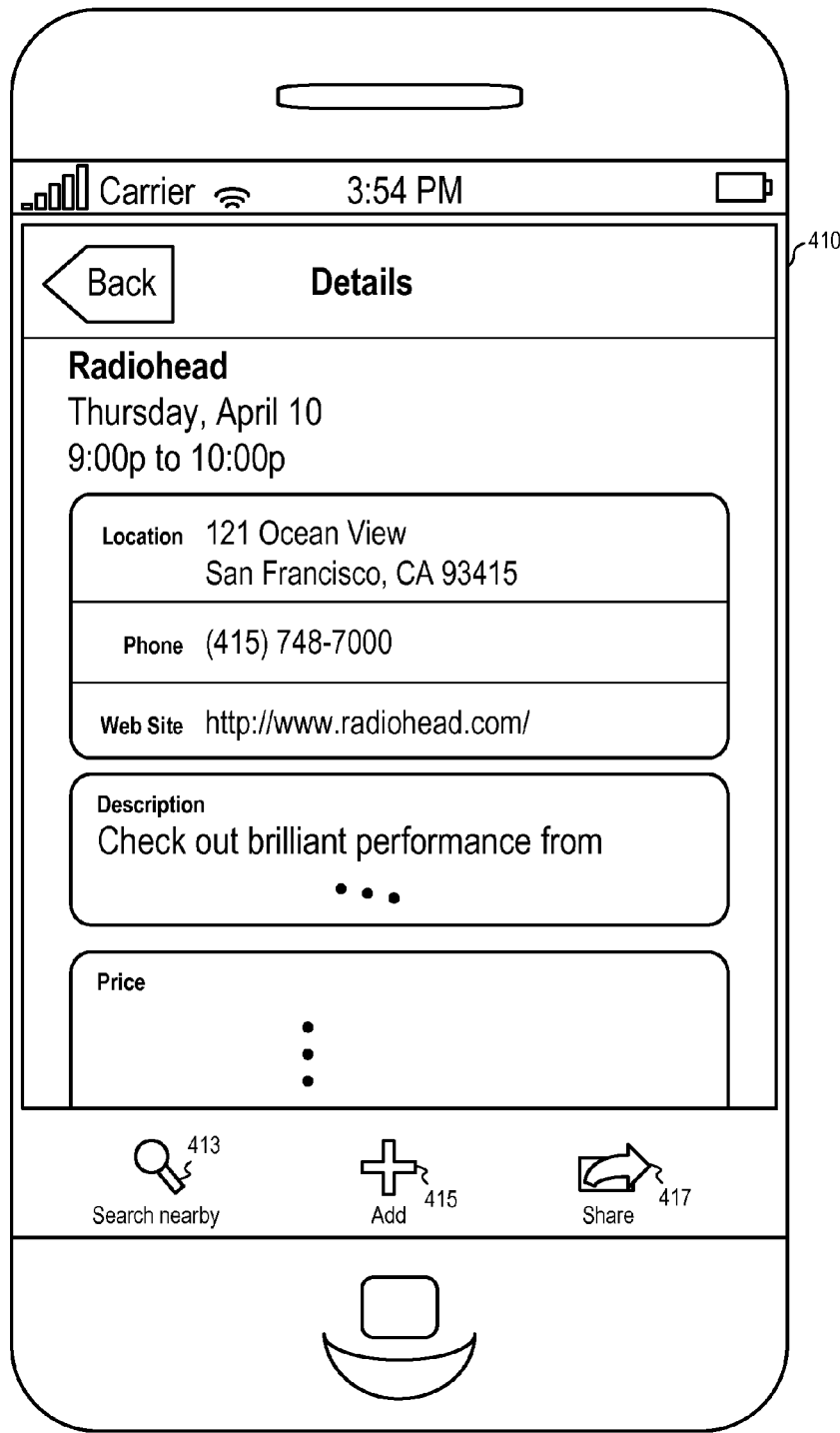

FIGS. 8-9 illustrate user interfaces to search and present listings of events according to one embodiment. In one embodiment, a user terminal (103) implementing the user interface as illustrated in FIGS. 8-9 is a mobile computing device having radios for wireless access to the web servers (107), such as radios for cellular communications, wireless local area network communications, wireless personal area network communications, etc. The mobile computing device may be a cellular phone with an integrated Internet browser and a touch screen. The mobile computing device may be a personal digital assistant with wired or wireless connections for network data communications. For example, the mobile computing device may be an iPhone or iPod Touch from Apple, Inc.

In FIG. 8, the user interface (400) includes a set of icon buttons (402, 404, 406 and 408). When the icon button (404) for "Businesses" is selected and highlighted, the end user (101) can search for business listings (121) in a way as illustrated in FIG. 4. When the icon button (402) for "Events" is selected and highlighted as in FIG. 8, the end user (101) can search for event listings (121) in a way as illustrated in FIG. 8. When the icon button (406) for "My Plans" is selected and highlighted, the end user (101) can view and/or edit the events planned by the end user (101). When the icon button (408) for "Favorites" is selected and highlighted, the end user (101) can view and manage bookmarked listings (121).

In FIG. 8, the icon button (402) for "Event" is highlighted; and the user interface (400) includes a set of icon buttons (401, 403, 405 and 407) to search and/or sort event listings. The end user (101) can select the search button (401) to request an interface (not shown) to specify a search criterion, such as a keyword, a location of interest, etc. The user interface (400) presents the search results under the set of icon buttons (401, 403, 405, and 407).

In FIG. 8, the end user (101) can select the icon button (403) to sort the search results according to the date and time of the event listings (121). In one embodiment, before the end user (101) specifies a search criterion using the search button (401), the end user (101) can directly select the icon button (403) to request a list of listings for events near the current location of the user terminal (103).

In one embodiment, when the icon button (403) is selected, the sorter (117) sorts the event listings according to the date and time of the events. The sorter (117) may sort the event listings to present the events closet to the current time first. In one embodiment, the search engine (113) or the sorter (117) excludes the event listings whose time period of the corresponding events have passed. In one embodiment, the sorter (117) sorts the event listings (121) strictly according to the date and time of the events. In another embodiment, the sorter (117) may divide the event listings (121) into a number of groups based on time slots, and sort the event listings (121) within the groups according to another parameter, such as popularity, advertiser value, or a combination of parameters.

In FIG. 8, the end user (101) can select the popular button (405) to sort the search results according to the level of user interest represented. In one embodiment, the level of user interest in an event listing is based on selection percentile, average user rating, and/or advertiser value. In one embodiment, the level of user interest in an event listing is based on the number of user planned events created via the event listing. In one embodiment, before the end user (101) specifies a search criterion using the search button (401), the end user (101) can directly select the popular button (405) to request a list of "hot" or "popular" event listings near the current location of the user terminal (103) on which the user interface (400) is.

In FIG. 8, the end user (101) can select the icon button (407) to request a list of new listings (121). In one embodiment, the search engine (113) selects the new listings (121) from a subset of the listings (121) that are recently added, such as event listings that have been added to the data storage facility for less than a predetermined period of time. In one embodiment, when the end user (101) selects the icon button (407), the sorter (117) sorts the event listings (121) in the search result according to the creation date and time of the event listings (121).

In FIG. 8, the end user (101) can select a listing (121) from the set of listing (121) (e.g., by selecting the icon (409)) to view details of the selected event listing (121).

The user interface (410) in FIG. 9 shows a display of details of the listing (121) for "Radiohead". It provides information about the event "Radiohead", such as the address, phone number, web site, description, price, and/or other information such as age suitability, performers, etc. In FIG. 9, the end user (101) can select the icon button (413) to search nearby the location of the listing (121) "Radiohead", select the icon button (417) to send a message to another user (101) to share the information about the listing (121) "Radiohead", or select the icon button (415) to add the listing (121) "Radiohead" to an existing event, or a new event.

Figure 10:
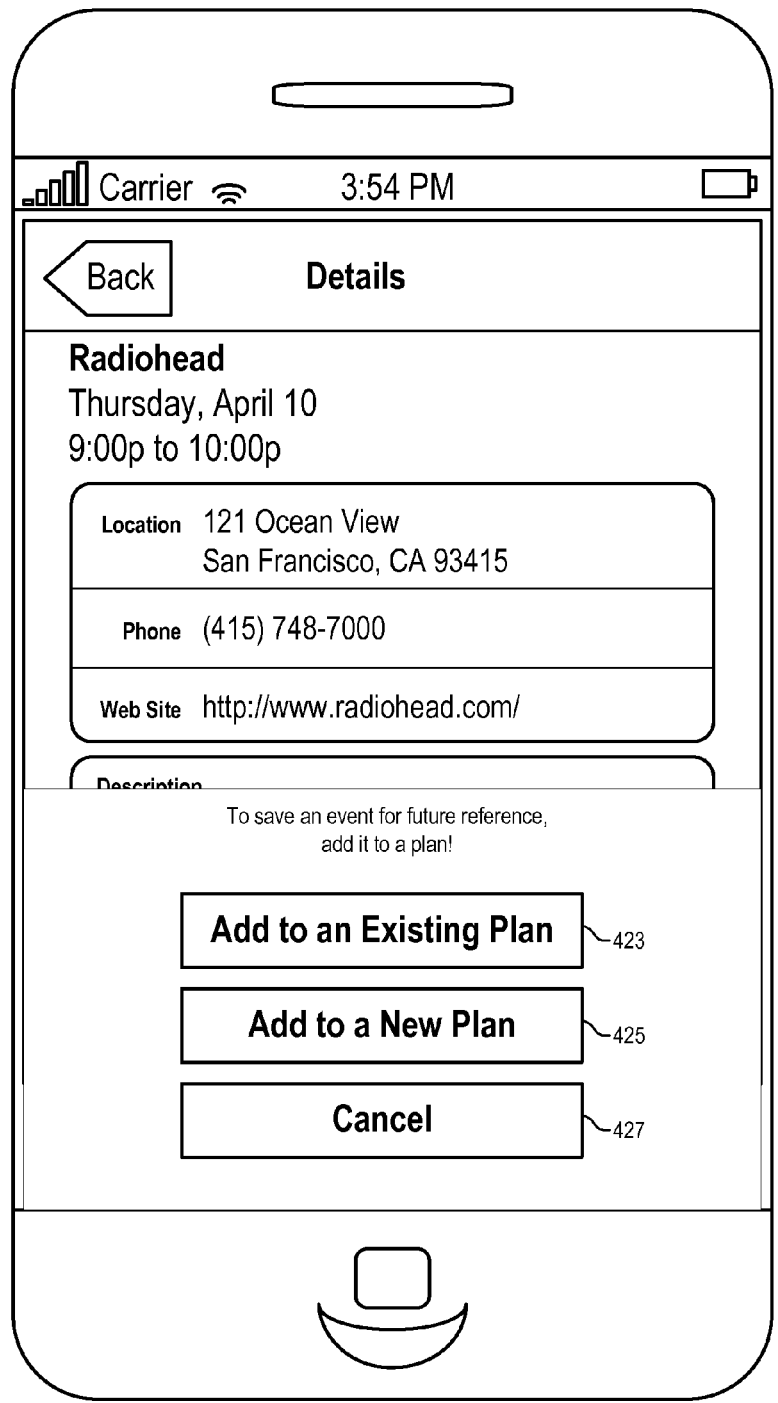
FIG. 10 shows a user interface to add an event listing into a user planned event according to one embodiment.

FIG. 10 shows a user interface to add an event listing into a user planned event according to one embodiment. After the icon button (415) in FIG. 9 is selected, the user interface shown in FIG. 10 includes a set of buttons (423-427) that provide the user (101) with the options to add the listing (121) "Radiohead" to an existing event, or a new event, or cancel the operation.

For example, the end user (101) can select the "Add to an Existing Plan" button (423) to add the listing (121) "Radiohead" as a location indicator in an existing plan scheduled in a calendar. For example, the end user (101) can select the "Add to a New Plan" to generate a new plan of an event, using the location of the listing (121) "Radiohead" as a location of the event. In one embodiment, when the end user (101) adds an event listing (121) "Radiohead" to a user planned event, the user terminal (103) or the web server (107) or an application server automatically uses the time period of the event "Radiohead" as a time period of the user planned event (115) and uses the location of the event "Radiohead" as a location of the user planned event (115), which may have multiple time periods and/or multiple locations.

Figure 11:
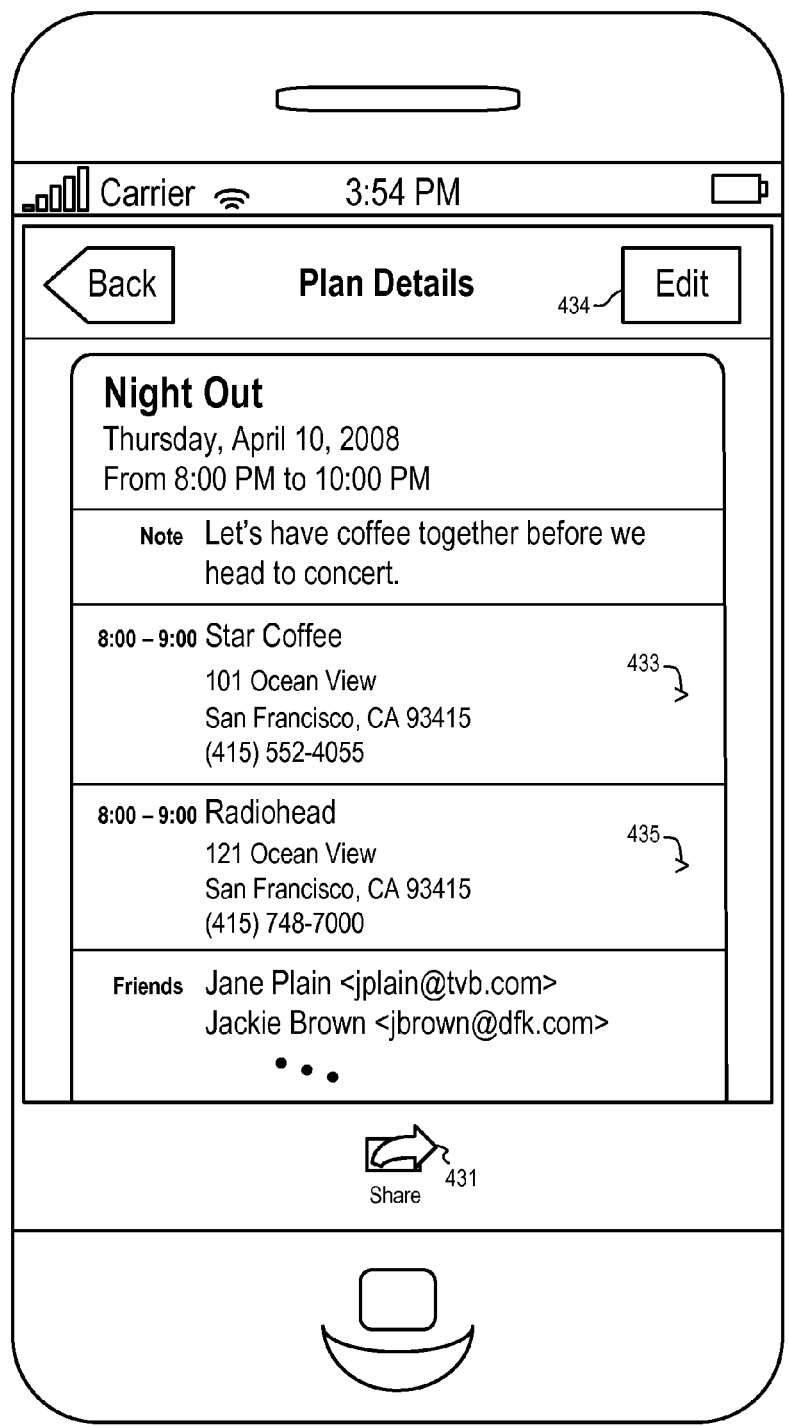
FIG. 11 illustrates a user interface to view a user planned event according to one embodiment.

FIG. 11 illustrates a user interface to view a user planned event according to one embodiment. In FIG. 11, the end user (101) can use the user interface to interact with an event planned using a selected business listing (121) for "Star Coffee" and an event listing (121) for "Radiohead". For example, the end user (101) may select the icon (433 or 435) to view the business listing (121) for "Star Coffee" or the event listing (121) for "Radiohead". In FIG. 11, the event (115) shows the location of the listing (121) for "Star Coffee" as a first location of the user planned event (115) and the location of the listing (121) for "Radiohead" as a second location of the user planned event (115); the end user (101) may add additional locations by selecting a listing (121) from a list of favorites, or selecting an entry from an address book, or typing in an address for the location. In one embodiment, the user can recall a previously saved search for a list of listings (121) and select a listing (121) from the list to specify a location of the event (115).

In FIG. 11, the end user (101) can select the edit button (434) to request a user interface to edit the user planned event (115). For example, the user can edit the note, add or remove friends for invitation to the user planned event (115), etc.

In FIG. 11, the end user (101) can also add a list of one or more friends to the planned event (115) by selecting the friends from an address book or by typing in contact information, such as email address, phone number, IM user identifiers, etc.

In FIG. 11, the end user (101) can select the share button (431) to request a message for sharing the information about the user planned event (115) with the friends listed in the user planned event (115). When the end user (101) shares the plan, the user terminal (103) and/or the web server (107) can automatically generate a message for notifying the friends via email, SMS, IM, and/or voice mail, fax, etc.

FIG. 12 illustrates an electronic message generated to share an event planned using a listing (121) according to one embodiment. In FIG. 12, the user terminal (103) or the web server (107) automatically generates the message that includes the location of the planned event based on the selected listing (121) for "Star Coffee". The message includes a link (245) to the listing (121) for "Star Coffee", a link (241) to a map showing an area near "Star Coffee", and a link (243) to a direction to "Star Coffee".

In the example in FIG. 12, the message also includes a link to a published event "Radiohead". Since the end user (101) has selected the event listing (121) for "Radiohead" as the additional location of the event for "Night Out", the message shows the location of the event listing (121) for "Radiohead" as the location of the scheduled plan during the time period 9:00 PM-10:00 PM. The user terminal (103) or the web server (107) automatically inserts some of the key information fields, such as the price, age suitability, performers, etc., into the message based on the listing (121) for "Radiohead".

In the example illustrated in FIG. 12, the message also includes a list of the friends that have been invited by the end user (101) to the plan.

There can be a number of different scenarios to create a user planned event (115). For example, the end user (101) may create a user planned event (115) to include one or more locations (119) of business listings (121). For example, the end user (101) may create a user planned event (115) to include one or more locations (119) of local event listings (121). For example, the user (101) may create a user planned event (115) to include one or more locations of contacts from a personal or shared address book. For example, the user (101) may create a user planned event (115) to include one or more manually entered locations. For example, the end user (101) may create a user planned event (115) to include a combination of different types of locations.

In FIG. 8, the end user (101) can select the "My Plans" icon (406) to view or edit user planned events (115). After the end user selects the "My Plans" icon (406), the user terminal (103) highlights the "My Plans" icon (406) and displays a loading progress indicator while loading data to display a list of user planned events (115). The end user (101) can select an event (115) from the list and delete the selected event (115), or select an event (115) from the list and view details of the selected event (115). The displayed list of user planned events (115) may include a list of past events (115) listed separately from a list of upcoming events (115). For each of the listed events (115), the user terminal (103) may show the title, date, time and location name of the corresponding event (115). In one embodiment, the user terminal shows the list of events (115) in ascending order according to the date of the events (115). The end user (101) can select an "Add New" icon to create a new event. The user terminal (103) may also show other icons, such as the "Businesses" icon (404) to search for business listings (121), the "Events" icon (402) to search for event listings (121), and the "Favorites" icon (408) to view or edit bookmarks of business listings (121). In one embodiment, a bookmark of a business listing (121) includes a reference to the business listing (121), which allows the end user (101) to access the business listing (121) by selecting the bookmark from a list of bookmarks.

In one embodiment, if connectivity issues prevent the display of a list of user planned events (115), a popup error message appears to inform the end user (101).

In one embodiment, the user terminal (103) includes a phone, such as a cellular phone. When an incoming phone call interrupts a session, the user terminal (103) displays icon buttons to allow the end user (101) to answer or decline the incoming phone call. After the end user (101) answers the phone call and then ends the call, or after the end user (101) declines the incoming phone call, the user terminal (103) returns to the same screen being reviewed by the end user (101) when the incoming phone call caused interruption.

In one embodiment, the user terminal (103) can receive SMS messages. Upon reception of an SMS message, the user terminal (103) overlays an SMS alert on the current screen with an option to close the alert to resume the use of the current application and an option to reply to the received SMS message. If the end user (101) selects to reply to the received SMS message, the user terminal (103) switches to an SMS application which allows the end user to review, send text messages. After the end user (101) returns to the application to view or plan events (115), the user terminal (103) returns to the same screen being reviewed by the end user (101) when the incoming SMS message caused interruption.

In one embodiment, the end user (101) can create a new event (115) from scratch without a location pre-populated by a business listing (121), or a local event listing (121). After the end user (101) selects the "Add New" icon, the user terminal (103) presents a user interface showing a header bar with "Make a Plan" text, "Cancel" button and "Done" button, an editable field for "Title", an editable field for "Notes", an icon to add a location, an icon to add a friend, etc.

If the user selects the editable filed for "Title", the user terminal (103) displays a title input field appears in the middle of screen with cursor focus at the beginning of field and a virtual keyboard. The user has the option to save the text entered in the title input field as the title of the user planned event (115), or cancel the operation and abandon the text in the title input field.

If the user selects the editable filed for "Notes", the user terminal (103) displays a notes input field appears in the middle of screen with cursor focus at the beginning of field and a virtual keyboard. The user has the option to save the text entered in the notes input field as the notes of the user planned event (115), or cancel the operation and abandon the text in the notes input field.

If the user selects the icon to add a location, the user terminal (103) displays location input fields in the middle of screen and a virtual keyboard. The user has the option to save the text entered in the location input fields as a newly added location of the user planned event (115), or cancel the operation and abandon the text in the location input fields.

In one embodiment, the location input fields include a field for "Name" with a bookmarks icon. The end user can manually enter a name of a location (e.g. Grandma's House) or select the bookmarks icon to populate this field by selecting a listing from a list of bookmarked business listings. In one embodiment, the name field is optional and does not appear in a detail view of the user planned event (115) if the name field is empty.

The location input fields further include fields for "Street", "City", "State", "Zip", and "Phone". The user can either entry information in these fields manually or select bookmarks icon from the field for "Name" to populate these fields using a selected listing.

In one embodiment, the location input fields may also include a message to inform the end user (101) of alternative ways to specify the location, such as a message of "Tip: You can also add locations while viewing Business or Event Detail pages by using the toolbar" that appears between the location input fields and the virtual keyboard.

After the end user (101) enters a location for the user planned event, the user terminal (103) displays an icon selectable to delete the location. Further, a start/end field appears below the location information. In one embodiment, the default start time is set to the next hour and the duration is one hour. For example, if the current time is 3:15 pm and the end user (103) adds a location to a user planned event (115), the default time at that location is 4 pm-5 pm. If there is already a location in the user planned event (115), the default start time is the end time of the last location added and the duration is one hour. The user can manually edit the start and end time for the location, if the default time is not desired.

If the user selects the icon to add a friend, the user terminal (103) presents an A-Z vertical shortcut list with contacts in an address book of the end user (103). The end user (103) can select a friend with one email address already in the address book to add the friend into the recipient list of the user planned event (115). If the selected friend has multiple email addresses, the user terminal (103) allows the end user (103) to select one or more from the email addresses of the selected friend for the user planned event (115). If the selected friend does not have an email address in the address book, the user terminal (103) can prompt the end user (103) to provide an email address, or to add the selected friend without an email address.

In some embodiments, the end user (103) can also SMS messages to inform friends of the user planned event (115). The end user (103) can select the cellular phone numbers of the friends from the address book into the user planned event (115) in a way similar to the selection of email address of friends.

After the end user (103) adds a friend to the user planned event (115), the user terminal (103) displays an icon selectable to remove the friend from the user planned event (115).

After the end user (103) creates a user planned event (115), the end user (103) can select the user planned event (115) from a list of user planned events (115) for viewing or for editing.

Figure 13:
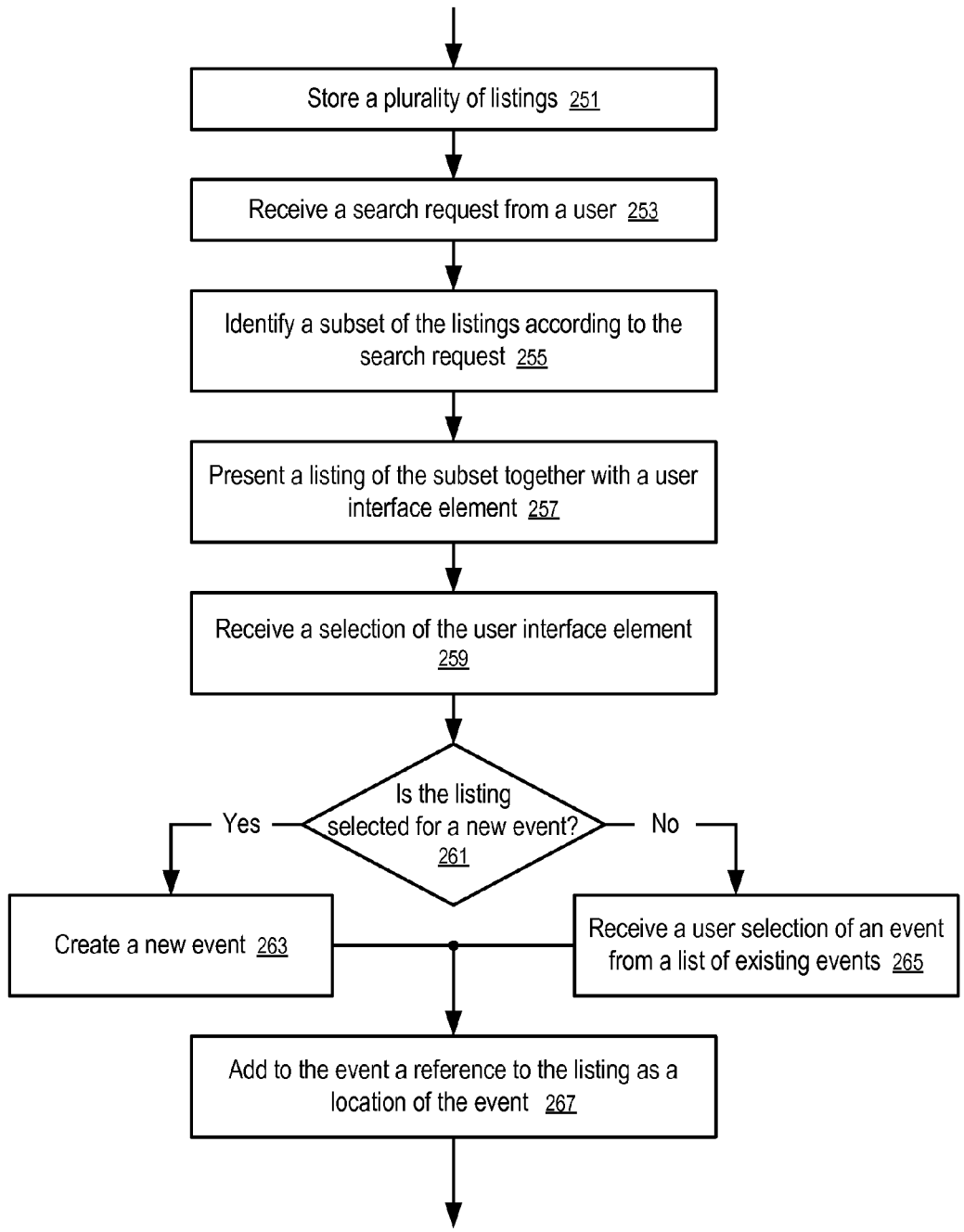
FIG. 13 shows a method to plan an event using a selected listing according to one embodiment.

FIG. 13 shows a method to plan an event (115) using a selected listing (121) according to one embodiment. In FIG. 13, a data storage facility (123) stores (251) a plurality of listings (121), which are accessible to an end user (101) via web servers (107). After a search engine (107) receives (253) a search request from a user (101) via the user terminal (103), the network (105) and the web severs (107), the search engine (107) identifies (255) a subset of the listings (121) according to the search request. The listings (121) may provide contact information of a business entity, such as a telephone directory listing (121) of the business entity.

After the user terminal (103) presents (257) a listing (121) of the subset together with a user interface element (e.g., 177, 215, 223 or 225), the user terminal (103) receives (259) a selection of the user interface element (e.g., 177, 215, 223 or 225) to add the listing (121) to an event (115) as an indicator of location for the event.

In one embodiment, the user interface element is associated with the listing (121), as the icon button (177) illustrated in FIG. 3; and when the user interface element is selected, the listing (121) is selected from the subset.

In one embodiment, the user interface element is not associated with a particular listing (121), as the icon button (215, 223 or 225) illustrated in FIG. 5 or 6. When the user interface element (215, 223 or 225) is selected, the user terminal (103) or the web server (107) uses the listing (121) that has been selected from the subset (e.g., selected via highlighting, or selected for display in a separate web page) as a location of the event (115).

In one embodiment, the web server (107) associates the user interface element with the listing (121). For example, the web server (107) may determine whether a listing (121) includes information specifying a geographic location, and provide the user interface element (e.g., 177) with the listing (121) in response to a determination that the listing (121) includes information specifying a geographic location (119). Alternatively, an application running on the user terminal (103) may determine whether to present the user interface element (e.g., 177) based on whether the listing (121) includes information specifying a geographic location (119).

If the operation (261) determines that the listing (121) is selected by the end user (101) for a new event, the user terminal (103) or the web server (107) creates (263) a new event (115) in response to the selection. If the operation (261) determines that the listing (121) is not selected for a new event, the user terminal (103) or the web server (107) presents a user interface to receive (265) a user selection of an event from a list of existing events (115). The user terminal (103) or the web server (107) then adds (267) to the event (115) a reference (e.g., 134 or 136) to the listing (121) as a location of the event.

In one embodiment, an event (115) is limited to have one location; and the selected listing (121) is used to replace the existing location in the event (115). In another embodiment, an event (115) can have more than one location; and the selected listing (121) is added to the existing event (115) in addition to one or more existing locations in the event (115).

In one embodiment, the user terminal (103) or the web server (107) generates a message (e.g., as illustrated in FIG. 12) using the listing (121) to provide information about the location of the event (115) represented by the reference (e.g., 134 or 136) to the listing (121). The user terminal (103) or the web server (107) then transmits the message to one or more communication contacts associated with the event. The message may be an electronic mail message, a short text message, a voice mail message, an instant message, or a fax message. In one embodiment, the message includes a link to the listing (121) hosted on a web server (107).

In one embodiment, the user terminal (103) is a mobile communication device which presents the user interface element (e.g., 177, 215, 223 or 225). The web server (107) remote to the mobile communication device, or another server not shown in FIG. 1, generates the message using the listings (121) stored on the data storage facility. During the scheduling of the event the end user (101) may provide a note (132) and a title (131) for inclusion in the message.

In one embodiment, the user terminal (103) provides a user interface that allows the end user (101) to select the one or more communication contacts from an address book (125). The user terminal (103) or the web server (107) associates the one or more communication contacts with the event (115) via the participant references (e.g., 137 or 138). When the end user (101) instructs the user terminal (103) to share the planned event (115), the user terminal (103) or the web server (107) automatically generates and sends messages to the one or more communication contacts.

In one embodiment, after receiving an invitation from an event planner, an invitee can access an event (115) stored on the data storage facility (123), make proposed changes to the event (115) and request the web severs (107) to notify the event planner and/or other invitees about the changes. Upon notification, the event planner may confirm/accept the changes, or reject the changes.

In one embodiment, the user terminal (103) or the web server (107) creates or modifies the event (115) in a calendar of the end user (101) hosted on the user terminal (103) or the web server (107), using the listing (121) selected by the end user (101). The end user (101) can associate a scheduled time period with the location represented by the reference (e.g., 134 or 136) to the listing (121). When there are multiple locations in an event (115), the end user (101) can specify a different time period for each of the locations planned in the event (115).

Figure 14:
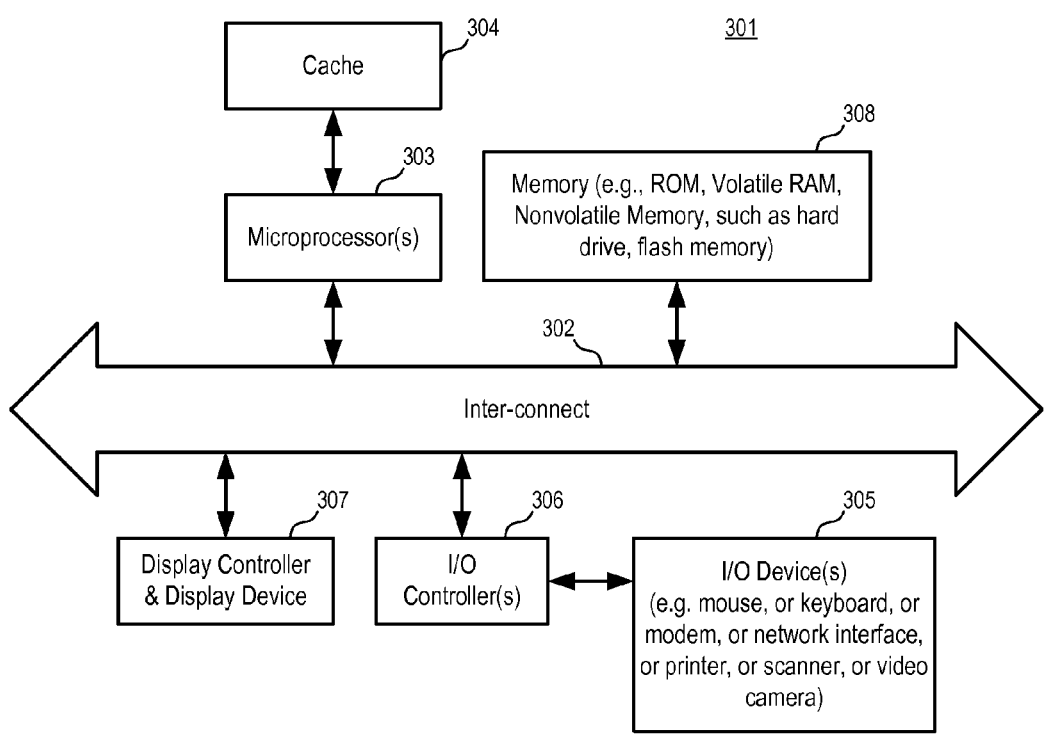
FIG. 14 illustrates a data processing system which can be used in various embodiments.

FIG. 14 illustrates a data processing system which can be used in various embodiments. While FIG. 14 illustrates various components of a computer system, it is not intended to represent any particular architecture or manner of interconnecting the components. Other systems that have fewer or more components may also be used.

In one embodiment, a server data processing system as illustrated in FIG. 14 is used as one of the web server(s) (107), a location detector (111), a search engine (113), a sorter (117), and/or a storage facility (123) for storing events (115), locations (119) and listings (121), etc. In some embodiments, one or more servers (e.g., 107, 111, 113, 117, 123) of the system can be replaced (e.g., by a system designer) with the service of a peer to peer network of a plurality of data processing systems, or a network of distributed computing systems. The peer to peer network, or a distributed computing system, can be collectively viewed (e.g., by the reader of the description) as a server data processing system.

In one embodiment, a user terminal (103) is a data processing system as illustrated in FIG. 14 to provide the user interfaces illustrated in FIGS. 3-11.

In FIG. 14, the data processing system (301) includes an inter-connect (302) (e.g., bus and system core logic), which interconnects a microprocessor(s) (303) and memory (308). The microprocessor (303) is coupled to cache memory (304) in the example of FIG. 14.

The inter-connect (302) interconnects the microprocessor(s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards are optional.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs". The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer implemented method comprising:
   presenting, via a computing device, an option to recall a search previously saved by a first user;
   responsive to a selection of the option to recall the search previously saved, presenting, via the computing device, a user interface element and a listing having geographic location information, wherein the user interface element and the listing having geographic location information are presented in a list of bookmarked listings, the bookmarked listings received from a source remote from the computing device that stores a plurality of listings, each listing of the plurality of listings corresponding to one or both of a respective business and a respective event, the source remote from the computing device also storing statistics of user interest in each of the plurality of listings;
   responsive to a selection of the user interface element, adding, via the computing device, to an event plan a reference to the listing having geographic location information to represent a first location of the event plan, and specifying a first time period associated with the first location represented by the reference to the listing having geographic location information;
   presenting, via the computing device, an option to search near the first location of the event plan;
   responsive to a selection of the option to search near the first location of the event plan, identifying a business listing corresponding to a business having a second location near the first location of the event plan;
   presenting, via the computing device, an option to add to the event plan a reference to the business listing to represent the second location of the event plan; and
   responsive to a selection of the option to add to the event plan the reference to the business listing, adding, via the computing device, to the event plan the reference to the business listing to represent the second location of the event plan and associating a second time period with the second location represented by the reference to the business listing, the second time period being adjacent in time to the first time period.

2. The method of claim 1, further comprising:
   receiving from the user input describing a further location of the event.

3. The method of claim 1, wherein the user interface element and the listing having geographic location information are presented to a second user in a message from the first user; wherein the message includes a reference to the listing having geographic location information.

4. The method of claim 1, further comprising:
   receiving a search request at a web server, wherein the listing having geographic location information is presented on a user terminal in response to the search request, the reference to the listing including a reference to the web server.

5. The method of claim 4, wherein the listing having geographic location information provides contact information of a business entity.

6. The method of claim 5, wherein the listing having geographic location information comprises a telephone directory listing of the business entity.

7. The method of claim 4, wherein the presenting of the user interface element and the listing having geographic location information comprises presenting a list of listings identified in response to the search request, the list of listings including the listing having geographic location information.

8. The method of claim 7, wherein the user interface element is associated with the listing having geographic location information in the list of listings.

9. The method of claim 8, further comprising:
determining whether the listing having geographic location information includes information specifying a geographic location; and providing the user interface element with the listing having geographic location information in response to a determination that the listing having geographic location information includes information specifying a geographic location.

10. The method of claim 1, further comprising:
presenting a list of events, wherein the reference to the listing having geographic location information is added to the event in response to a selection of the event from the list of events.

11. The method of claim 10, wherein the event has the first location prior to the reference to the listing having geographic location information being added to the event.

12. The method of claim 1, further comprising:
generating a message using the listing having geographic location information to provide information about the location of the event represented by the reference to the listing; and
transmitting the message to at least one communication contact associated with the event.

13. The method of claim 12, wherein the message comprises one of an electronic mail message, a short text message, a voice mail message, an instant message, and a fax message.

14. The method of claim 12, wherein the message comprises a link to the listing having geographic location information hosted on a web server.

15. The method of claim 12, wherein the user interface element is presented on a mobile communication device; and the message is generated on a server remote to the mobile communication device.

16. The method of claim 15, wherein the message further includes a note provided by the user in scheduling the event.

17. The method of claim 12, wherein the user interface element is presented on a mobile communication device; and the message is generated on the mobile communication device.

18. The method of claim 12, further comprising:
providing a user interface to select the at least one communication contact from an address book; and
associating the at least one communication contact with the event.

19. The method of claim 1, further comprising:
associating a scheduled time period with the location represented by the reference to the listing.

20. The method of claim 19, further comprising: creating the event in a calendar in response to the selection.

21. A non-transitory machine-readable medium having stored thereon a set of instructions, which when executed perform a method comprising:
presenting an option to recall a search previously saved by a first user;
responsive to a selection of the option to recall the search previously saved, presenting a user interface element and a listing having geographic location information, wherein the user interface element and the listing having geographic location information are presented in a list of bookmarked listings, the bookmarked listings received from a source remote from the computing device that stores a plurality of listings, each listing of the plurality of listings corresponding to one or both of a respective business and a respective event, the source remote from the computing device also storing statistics of user interest in each of the plurality of listings;
responsive to a selection of the user interface element, adding to an event plan a reference to the listing having geographic location information to represent a first location of the event plan, and specifying a first time period associated with the first location represented by the reference to the listing having geographic location information;
presenting an option to search near the first location of the event plan;
responsive to a selection of the option to search near the first location of the event plan, identifying a business listing corresponding to a business having a second location near the first location of the event plan;
presenting an option to add to the event a reference to the business listing to represent the second location of the event plan; and
responsive to a selection of the option to add to the event plan the reference to the business listing, adding, via the computing device, to the event plan the reference to the business listing to represent the second location of the event plan and associating a second time period with the second location represented by the reference to the business listing, the second time period being adjacent in time to the first time period.

22. A data processing system, comprising:
one or more processors coupled one or more non-transitory storage media, the one or more non-transitory storage media to retain instructions, the one or more processors to execute the instructions to:
present an option to recall a search previously saved by a first user;
responsive to a selection of the option to recall the search previously saved, present a user interface element and a listing having geographic location information, wherein the user interface element and the listing having geographic location information are presented in a list of bookmarked listings, the bookmarked listings received from a source remote from the computing device that stores a plurality of listings, each listing of the plurality of listings corresponding to one or both of a respective business and a respective event, the source remote from the computing device also storing statistics of user interest in each of the plurality of listings;
add to an event plan a reference to the listing having geographic location information to represent a first location of the event plan specify a first time period associated with the first location represented by the reference to the listing having geographic location information, responsive to a selection of the user interface element;
present an option to search near the first location of the event plan;
responsive to a selection of the option to search near the first location of the event, identify a business listing corresponding to a business having a second location near the first location of the event plan;

present an option to add to the event plan a reference to the business listing to represent the second location of the event plan; and responsive to a selection of the option to add to the event plan the reference to the business listing, add to the event plan the reference to the business listing to represent the second location of the event plan and associating a second time period with the second location represented by the reference to the business listing, the second time period being adjacent in time to the first time period.

* * * * *